Sept. 24, 1968 M. E. BRADLEY ET AL 3,403,288
DYNAMIC INTENSITY CORRECTIONS CIRCUIT
Filed Oct. 28, 1965
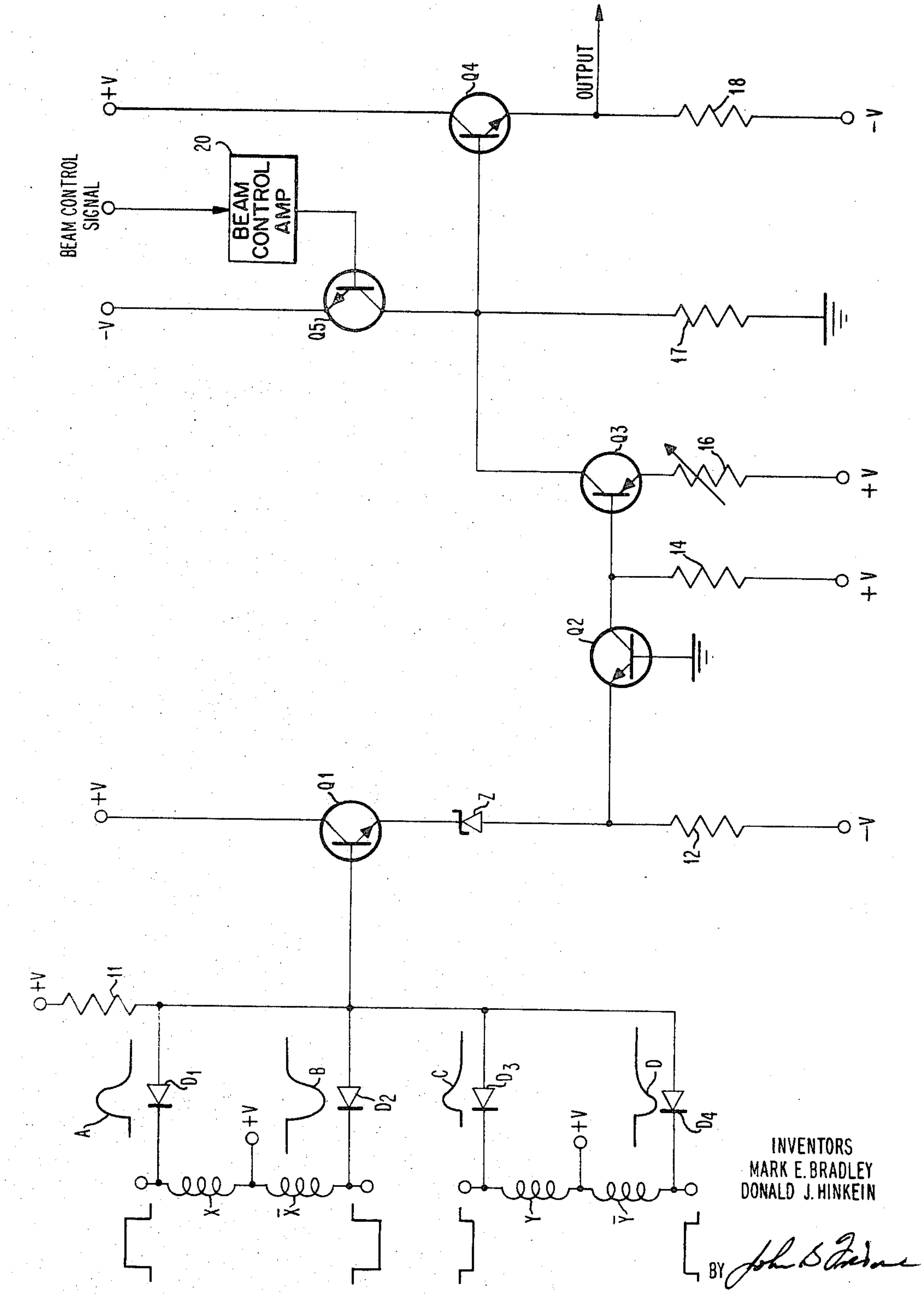
INVENTORS
MARK E. BRADLEY
DONALD J. HINKEIN
BY John B. [signature]
ATTORNEY

United States Patent Office 3,403,288
Patented Sept. 24, 1968

3,403,288

DYNAMIC INTENSITY CORRECTIONS CIRCUIT

Mark E. Bradley, Red Hook, and Donald J. Hinkein, Germantown, N.Y., assignors to International Business Machines Corporation, Armonk, N.Y., a corporation of New York Filed Oct. 28, 1965, Ser. No. 505,483
3 Claims. (Cl. 315—22)

ABSTRACT OF THE DISCLOSURE

An intensity correction circuit is utilized in a cathode ray display having step deflection currents applied to electromagnetic deflection windings. The kickback voltages induced in the windings by the application of the step currents are detected by diode circuitry. The most negative of the detected voltages is combined with a beam control signal for application to the intensity control grid of the cathode ray tube to maintain uniform illumination despite nonlinear beam deflection velocities.

This invention relates to visual display devices generally and more particularly to visual display devices of the cathode ray type.

Cathode ray tubes have long been used for visual display purposes. This use takes many forms. However, from the point of view of the present invention, the various uses can be divided into two categories. First, are those displays which utilize traces or lines drawn on the face of the tube such as oscilloscopes and television sets and second, those displays which provide point intensification, i.e., the beam is turned off during positioning and intensified when stationary. This invention is unnecessary in devices operating according to the latter category since the uniformity of intensification or illumination is not a problem.

Cathode ray tubes used to display lines requires special configurations to achieve uniform beam velocity. Thus, special care must be employed in the generation of deflection voltages to insure the uniform intensification of the beam for a fixed video signal applied to the intensity control element of the tube.

These requirements are not particularly burdensome in the case of television or raster type displays. However, in computer controlled graphic display systems where the beam must be deflected in many directions under computer control, they have proved burdensome. The computer output which directs the deflection, in most instances comprises a digital signal defining the position to which the beam must be moved. Generators under the control of this signal have been used to generate X and Y deflection voltages which move the beam at a uniform velocity to the defined point.

Recently, it was proposed in the interest of simplicity and cost reductions, that the digital signals be converted in digital to analog converters to fixed or step currents of magnitudes determined by the digital value and applied directly to the deflection coils. Such a scheme will result in a deflection to the desired point, however, due to the inductance of the deflection yoke, the beam velocity is nonlinear and the trace produced on the screen is of poor quality due to the nonuniformity of illumination or intensification.

One object of the invention is to provide a novel circuit for correcting the intensity of the image produced on a display device.

Another object of the invention is to provide an intensity correction circuit for a display device which is inherently accurate.

A further object is to provide a correction circuit as set forth above which is inexpensive to manufacture and reliable in operation.

The invention contemplates an intensity correction circuit for a cathode ray display device employing electromagnetic deflection windings to which discrete currents are applied for causing beam deflections comprising, means for detecting the kickback voltage across the windings induced by the step of current applied to the windings, means for generating a beam control voltage and means for combining the detected kickback voltage and the beam control voltage and applying the combined voltages to the display device to thereby maintain uniform beam intensity.

The foregoing and other objects, features and advantages of the invention will be apparent from the following more particular description of a preferred embodiment of the invention as illustrated in the accompanying drawing.

The single figure is a schematic diagram of a novel intensity correction circuit constructed according to the invention.

The cathode ray display tube, not shown, is provided with push pull X and Y deflection windings labeled X and $\overline{X}$; and Y and $\overline{Y}$, in the drawings. The X and Y deflection step currents are applied to these windings and induce a "kickback" voltage across each winding. The induced voltages are graphically illustrated at A, B, C and D. The magnitudes of the voltages induced in the X and $\overline{X}$ winding will be substantially equal since the step currents through the X and $\overline{X}$ winding are equal in magnitude. Similarly, the magnitudes of the voltages induced in the Y and $\overline{Y}$ winding will be substantially equal. The induced voltages are directly proportional to beam velocity in the specified direction and the more negative of the four may be utilized to generate a correction voltage which, when added to the beam control voltage, will result in uniform illumination or intensification from the beginning to the end of each vector or line drawn and the same uniformity will be preserved for vectors of different lengths.

Windings X, $\overline{X}$, Y and $\overline{Y}$ are connected to the base of a transistor $Q_1$ by diodes $D_1$, $D_2$, $D_3$ and $D_4$, respectively and the base is connected to a source of positive potential by a resistor 11. With this arrangement, the base of transistor $Q_1$ will be at a potential controlled by the more negative of the induced or "kickback" voltages in the deflection windings. This voltage controls transistor $Q_1$ which is connected as an emitter follower for impedance matching purposes. The collector of $Q_1$ is connected to a positive bias source V and the emitter is connected to negative bias by a Zener diode Z and a resistor 12. Zener diode Z is utilized to shift the voltage level without signal deterioration and the output of the emitter follower stage $Q_1$ is derived across resistor 12.

A grounded base amplifying stage, utilizing a transistor $Q_2$ amplifies the voltage developed across resistor 12 and applies the same via its collector circuit, which includes a resistor 14 connected to a positive bias source V, to the base of a transistor $Q_3$. The emitter of transistor $Q_3$ is connected to a positive bias source by an adjustable resistor 16 which may be preset to control the gain in $Q_3$. The collector of $Q_3$ is connected to ground by a resistor 17 and to the base of a transistor $Q_4$ which is operated as an emitter follower and develops its output across a resistor 18. The voltage from $Q_3$ developed across resistor 17 and applied to the base of $Q_4$ constitutes the dynamic correction voltage added to the beam control voltage which is also developed across resistor 17.

The beam signal is applied to an amplifying stage 20 which controls the base of a transistor switch $Q_5$ which is normally saturated. When the beam is to write, the beam control signal cuts $Q_5$ off and the base of $Q_4$ rises to ground from the negative supply voltage at the emitter of $Q_5$. Thus, the base of transistor $Q_4$ will, depending on the correction voltage developed across resistor 17, be at some positive voltage above ground, or at ground, if no correction voltage is developed when the beam is on. When the beam is "off" circuit 20 turns $Q_5$ on and the base of $Q_4$ is negative and correction voltages added will not, under any circumstances, cause the base of $Q_4$ to becomes sufficiently positive to turn the beam on. Such a situation might arise when the beam is to be moved while blanked.

While the invention has been particularly shown and described with reference to a preferred embodiment thereof, it will be understood by those skilled in the art that various changes in form and detail may be made therein without departing from the spirit and scope of the invention.

What is claimed is:

1. A dynamic intensity correction circuit for use in display systems employing cathode ray tubes having electromagnetic deflection windings to which step currents are applied for implementing beam deflections comprising, means for detecting the voltages induced in the windings when the step currents are applied thereto, means for generating a beam control voltage, and means for combining one of the detected induced voltages and the beam control voltage to generate a composite corrected beam control voltage.

2. A dynamic intensity correction circuit for use in display systems employing cathode ray tubes having push pull electromagnetic deflection windings to which opposed step currents are applied for implementing beam deflections comprising, means for detecting the voltages induced in the windings when the step currents are applied thereto, means for generating a beam control voltage, and means for combining the detected induced voltage having the greatest amplitude with respect to a preselected polarity and the control voltage to generate a composite corrected beam control voltage.

3. A dynamic intensity correction circuit as defined in claim 2 in which said detecting means includes a diode connected to each winding and said means for combining the detected induced voltage having the greatest amplitude includes means for biasing said diodes whereby only the diode having the greatest amplitude with respect to a pre-selected polarity applied thereto is forward biased.

References Cited

UNITED STATES PATENTS 2,994,802 8/1961 Shelby .............. 315—22

RODNEY D. BENNETT, *Primary Examiner.*

T. H. TUBBESING, *Assistant Examiner.*